April 6, 1943.  E. F. W. ALEXANDERSON  2,315,491
ELECTRIC DRIVE
Filed April 1, 1942
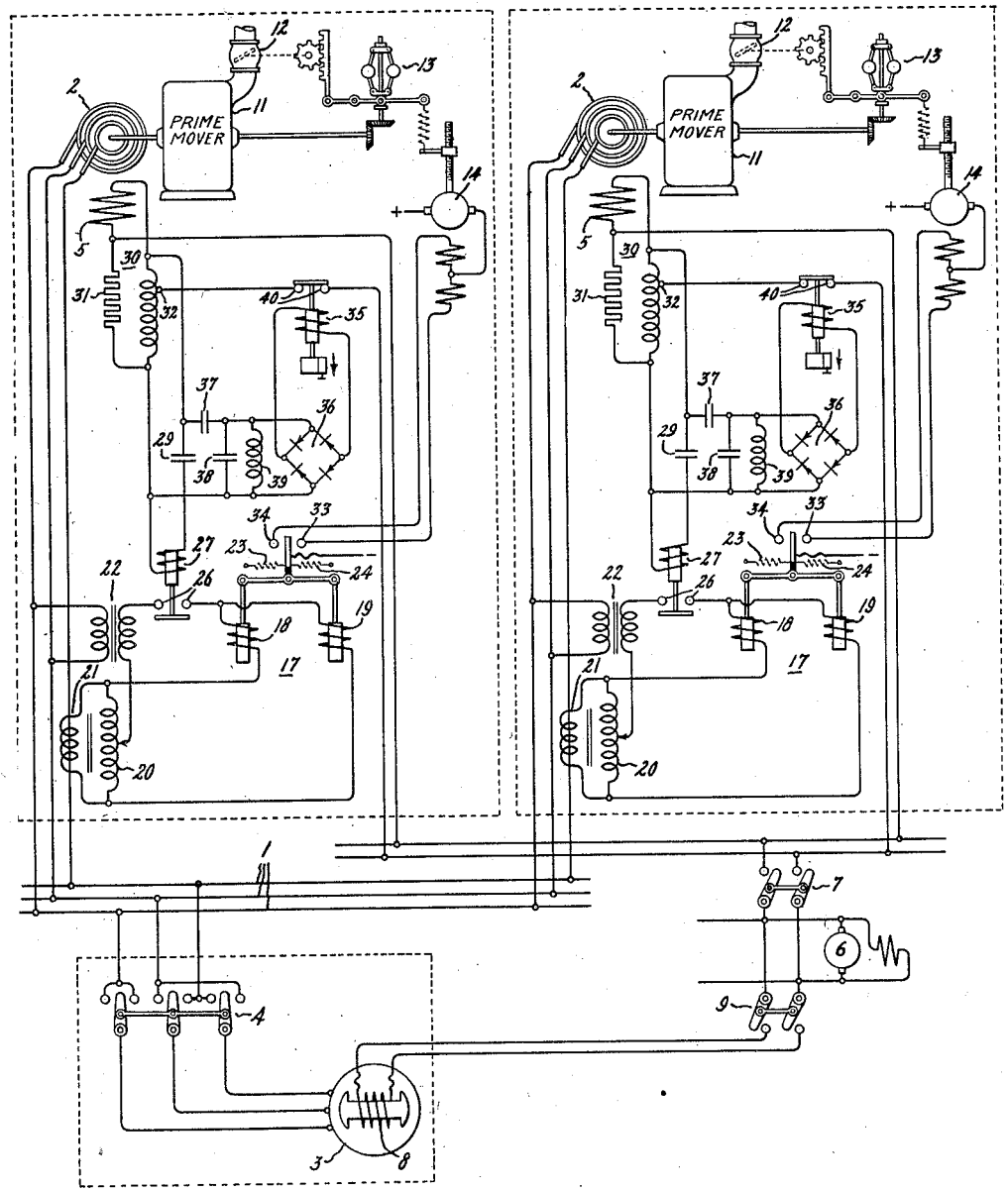
Inventor:
Ernst F. W. Alexanderson,
by Harry E. Dunham
His Attorney.

Patented Apr. 6, 1943

2,315,491

UNITED STATES PATENT OFFICE 2,315,491

ELECTRIC DRIVE

Ernst F. W. Alexanderson, Schenectady, N. Y., assignor to General Electric Company, a corporation of New York Application April 1, 1942, Serial No. 437,239

13 Claims. (Cl. 290—4)

My invention relates to electric drives and more particularly to improvements in the control of multiple unit power plant electric drives.

In my copending applications, Serial Numbers 366,322 and 437,237, respectively filed June 6, 1940 and April 1, 1942 and assigned to the same assignee as this application, I have disclosed and claimed arrangements for automatically controlling each unit of a multiple unit power plant so as to effect the automatic synchronization thereof whenever it is out of step with the other generators of the plant. Each of these prior arrangements requires the use of a pilot rotating machine for each unit of the plant.

One object of my present invention is to provide an electric drive of the type disclosed in the aforesaid patent applications in which the automatic synchronizing of each generator can be effected by a system of relays which does not require the use of rotating pilot machines.

Another object of my invention is to provide an improved arrangement of apparatus for preventing stalling of a prime mover in case the automatic synchronizing means fails to prevent the speed of the associated generator from decreasing below a predetermined subsynchronous speed.

When a synchronous machine is operating out of step with the electric system to which it is connected, the average torque of the machine is not very strong because the synchronizing torque is alternatively in one direction and then the other. There is, however, a large pulsation in the energy flow between the machine and the system, but tests have shown that the average torque for a given slip is substantially the same whether the machine is operating below or above the system frequency. Therefore, I have found that the energy flow between the machine and the system cannot be used as a means of discriminating between subsynchronous and supersynchronous operation of the machine. My analysis of the pulsations of energy flow, however, have indicated that the direction of the energy flow between the machine and the system depends upon the relative positions of the rotor and the stator of the machine and is independent of whether or not the machine is operating subsynchronously or supersynchronously. I have, also, observed that when the machine is operating subsynchronously and the energy flow is from the system to the machine, the voltage induced in the field circuit of the machine is in one direction, whereas when the machine is operating supersynchronously and the energy flow is from the system to the machine, the voltage induced in the field circuit of the machine is in the opposite direction. Therefore, in accordance with my present invention, I employ suitable means which is jointly controlled by the direction of the induced voltage in the field circuit of a machine and the direction of energy flow between the machine and the system for controlling the governor of the associated prime mover so that when the machine is operating subsynchronously with respect to the rest of the system, the speed of the machine is increased, and when the machine is operating supersynchronously with respect to the rest of the system, the speed of the machine is decreased.

My invention will be better understood from the following description when taken in connection with the accompanying drawing, the single figure of which diagrammatically illustrates a multiple unit power plant electric drive embodying my invention, and the scope of my invention will be pointed out in the appended claims.

In the multiple unit power plant electric drive shown in the drawing, 1 represents a main polyphase power circuit across which are connected a plurality of synchronous generators 2 and a synchronous motor 3. A suitable reversing switch 4 is provided for selectively reversing the phase rotation of the motor 3.

Each of the synchronous generators 2 is provided with a direct current field winding 5 which is energized from a suitable source of direct current, such, for example, as the common shunt exciter 6. A suitable switch 7 is provided for selectively controlling the connection of all of the generator field windings 5 to the shunt exciter 6. The synchronous motor 3 is also provided with a direct current winding 8 which is arranged to be connected to the shunt exciter 6 by a suitable switch 9.

The generators 2 are separately driven by suitable prime movers 11, such, for example, as Diesel engines. Each prime mover 11 has a throttle 12 which is controlled by a speed governor 13. The setting of each governor 13 is arranged to be adjusted by a separate reversible synchronizing motor 14, shown as a direct current motor.

The automatic means for controlling the synchronizing of the generators 2 includes the differential relays 17, respectively connected so as to respond to the direction of power flow between the generators and the power circuit 1. In the particular embodiment shown in the drawing, each relay 17 includes two opposing windings 18 and 19, respectively connected across different halves of an impedance device 20 which in turn is connected across the secondary winding of a current transformer 21, the primary winding of which is connected in series with one of the phase conductors connecting the associated generator 2 to the circuit 1. Connected in series with both of the windings 18 and 19 of each relay 17 is the secondary winding of a potential transformer 22, the primary winding of which is connected across one phase of the associated generator 2. In this manner the windings 18 and 19 of each relay are so connected that the current through the winding 18 is proportional to $E+I$ and the current through the winding 19 is proportional to $E-I$ when the power flow is in one direction between the associated generator 2 and the power circuit 1, and the current through the winding 18 is proportional to $E-I$ and the current through the winding 19 is proportional to $E+I$ when the power flow is in the opposite direction where E represents the effective voltage applied to the primary winding of the transformer 22 and I is the effective current flowing through the primary winding of the current transformer 21. Preferably, each relay 17 is provided with suitable biasing means, such as the springs 23 and 24, for maintaining its armature in a balanced position until the power flow exceeds a predetermined value in a given direction so that $E+I$ exceeds $E-I$ more than a predetermined amount. In order that each relay 17 may operate the associated synchronizing motor 14 to adjust the setting of the associated governor 13 to decrease the driving torque of the associated prime mover 11 only when the associated generator 2 is operating supersynchronously and increase the driving torque only when the associated generator is operating subsynchronously with respect to the power circuit 1, I also provide in the energizing circuits of the windings 18 and 19 of each relay 17 the contacts 26 of an associated relay 27 which is connected across the field winding 5 of the associated generator 2 so that it responds to the induced field current only when this current is flowing in a predetermined direction relative to the direct current exciting current in the field winding. In the particular embodiment shown in the drawing, the winding of each relay 27 and an associated capacitor 29 are connected in series across an inductive device 30 which in turn is connected in series with an associated resistor 31 across the terminal of the associated field winding 5. The inductive device 30 is provided with a tap 32 so that the exciting current supplied to the field winding 5 from the exciter 6 flows through a small portion of the inductive device. With such an arrangement, each relay 27 responds in effect to the predetermined polarity of the induced field current since it is sufficiently energized to close its contacts 26 during only that half cycle of the induced field current in the associated field winding when the induced field current is in a predetermined direction relative to the exciting current flowing through it. Since for any given relative position of the rotor and stator of a generator 2, when it is operating asynchronously, the voltage induced in the field winding is in one direction when the generator is operating subsynchronously and in the opposite direction when the generator is operating supersynchronously, it will be evident that if, for example, when the generator is operating subsynchronously, the associated relay 27 closes its contacts 26 when the power flow is in such a direction that the current through the winding 18 is proportional to $E+I$ and the current through the winding 19 is proportional to $E-I$, the relay 27 will close its contacts 26 under supersynchronous operation of the motor when the power flow is in the opposite direction and at a time when the current through the winding 18 is proportional to $E-I$ and the current through the winding 19 is proportional to $E+I$. Consequently, when the generator 2 is operating subsynchronously, the associated relay 17 closes its contacts 33 once every slip cycle to effect the operation of the associated synchronizing motor 14 in one direction to increase the speed of the associated prime mover 11, and when a generator 2 is operating supersynchronously, the associated relay 17 closes its contacts 34 once every slip cycle to effect the operation of the associated synchronizing motor 14 in the opposite direction to decrease the speed of the associated prime mover 11. It will be observed that the relays 27 constitute means for discriminating between synchronous and asynchronous operation of the associated generators 2, and the associated differential relays 17 cooperate with the relays 27 so as to discriminate between supersynchronous and subsynchronous operation of the associated generators.

In order to prevent stalling of a prime mover 11 in case its speed drops too rapidly for the associated synchronizing means to restore synchronism, I provide means for quickly decreasing the load on the prime mover when the speed thereof decreases below a predetermined value. In the particular embodiment shown in the drawing, this means is a relay 35 which is connected in series with a full-wave rectifier 36 and a capacitor 37 across the terminals of the associated inductive device 32 in the circuit of the associated field winding 5. The relay 35 is tuned in any suitable manner, such, for example, as by a shunt capacitor 38 and a shunt inductive device 39 so that it does not operate to open its contacts 40 until the frequency of the current induced in the associated field winding 5 exceeds a predetermined value. The opening of the contacts 40 of the relay 35 disconnects the associated field winding 5 from the shunt exciter 6 so that whenever the speed of the associated generator falls a predetermined amount below the average speed of the other generators connected to the power circuit 1, excitation is removed from the subsynchronously operating generator so as to substantially instantaneously remove the load from the associated prime mover 11 to prevent it from stalling. Preferably each relay 35 is prevented in any suitable manner from reclosing its contacts 40 for a predetermined time interval so as to allow the generator speed to increase an appreciable amount before the field winding 5 of the associated generator 2 is reconnected to the exciter 6.

The operation of the automatic synchronizing means and the means for preventing stalling will be clear from the above description. When any generator falls out of step, the associated relays 17 and 27 cooperate to effect the closing of the contacts 34 of the relay 17 to effect the operation of the associated synchronizing motor 14 to decrease the speed of the associated prime mover 11 in case the generator 2 is operating supersynchronously and to effect the closing of the contacts 33 of the relay 17 to effect the operation of the associated synchronizing motor 14 to increase the speed of the associated prime mover 11 in case the generator is operating subsynchronously. In case the speed of any generator decreases to such a low value that the induced field current is sufficient to operate the associated relay 35, this relay by opening its contacts 40 disconnects the field winding 5 of the subsychronously operating generator 2 from the source of excitation 6 so that the load on the subsynchronously operating generator is suddenly decreased to effect an increase in the speed of the associated prime mover. When the relay 35 recloses its contacts 40 in response to the increase in speed of its associated generator 2, the relays 17 and 27 continue to operate to effect an increase in the speed setting of the associated governor 13 so that usually it will require only one operation of the relay 35 before the automatic synchronizing means can again restore synchronous operation of the associated generator 2.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, an electric circuit energized by an alternating potential, a synchronous dynamoelectric machine connected thereto, a device for discriminating between synchronous and asynchronous operation of said machine, and separate means under the control of said device for discriminating between supersynchronous and subsynchronous operation of said machine.

2. In combination, an electric circuit energized by an alternating potential, a synchronous dynamoelectric machine connected thereto, a direct-current field winding for said machine, means responsive to induced currents in said field winding for discriminating between synchronous and asynchronous operation of said machine, and an electro-responsive device energized in accordance with a function of the armature current and voltage of said machine and controlled by said means during asynchronous operation so as to discriminate between supersynchronous and subsynchronous operation of said machine.

3. In combination, an electric circuit energized by an alternating potential, a synchronous dynamoelectric machine connected thereto, a direct-current field winding for said machine, a relay having normally open contacts which are arranged to be closed periodically in accordance with the polarity of the current pulsations in the field winding of said machine which result from asynchronous operation thereof, and a differential device connected to be energized by the closing of said relay contacts, said device having two elements whose energizations are respectively in accordance with the sum and difference of the armature current and voltage of said machine.

4. In combination, an electric circuit energized by an alternating potential, a synchronous dynamoelectric machine connected thereto, a direct-current field winding for said machine, a relay responsive to a predetermined polarity of the current pulsations in the field winding of said machine which result from asynchronous operation thereof, a differential device connected to be energized by the operation of said relay, said device having two elements whose energizations are respectively in accordance with the sum and difference of the armature current and voltage of said machine, and means responsive to the operation of said differential relay for varying the speed of said machine in such a manner as to establish synchronous operation thereof.

5. In combination, an energized alternating current circuit, a synchronous dynamoelectric machine connected thereto, a prime mover driving said machine and means for regulating the speed of said prime mover under asynchronous operation of said machine so as to increase the speed thereof when it is operating subsynchronously and to decrease the speed thereof when it is operating supersynchronously including means dependent upon the direction of power flow between said machine and circuit, and means for rendering said power flow dependent means operative only while the power flow is in one direction when said machine is operating subsynchronously and only while the power flow is in the opposite direction when said machine is operating supersynchronously.

6. In combination, an energized alternating current circuit, a synchronous dynamoelectric machine connected thereto, a prime mover driving said machine and means for regulating the speed of said prime mover under asynchronous operation of said machine so as to increase the speed thereof when it is operating subsynchronously and to decrease the speed thereof when it is operating supersynchronously including a differential relay having windings connected to said machine so as to produce two opposing torques respectively proportional to the sum and difference of the armature voltage and current of said machine, and means for rendering said differential relay operative only while the power flow between said machine and circuit is in one direction when said machine is operating subsynchronously and only while the power flow is in the opposite direction when said machine is operating supersynchronously.

7. In combination, an energized alternating current circuit, a synchronous dynamoelectric machine connected thereto, a prime mover driving said machine and means for regulating the speed of said prime mover under asynchronous operation of said machine so as to increase the speed thereof when it is operating subsynchronously and to decrease the speed thereof when it is operating supersynchronously including a differential relay having windings connected to said machine so as to produce two opposing torques respectively proportional to the sum and difference of the armature voltage and current of said machine, and means responsive to an induced current of a predetermined polarity in the field circuit of said machine for rendering said relay operative.

8. In combination, an energized alternating current circuit, a synchronous dynamoelectric machine connected thereto, a prime mover driving said machine and means for regulating the speed of said prime mover under asynchronous operation of said machine so as to increase the speed thereof when it is operating subsynchronously and to decrease the speed thereof when it is operating supersynchronously including means dependent upon the polarity of the induced current in the field circuit of said machine and the direction of the power flow between said machine and circuit.

9. In combination, an energized alternating current circuit, a synchronous dynamoelectric machine connected thereto, and means for discriminating between supersynchronous and subsynchronous operation of said machine while connected to said circuit including means responsive to asynchronous operation of said machine and power directional means controlled by said asynchronous responsive means.

10. In combination, an energized alternating current circuit, a synchronous dynamoelectric machine connected thereto, and means for discriminating between supersynchronous and subsynchronous operation of said machine while connected to said circuit including means responsive to asynchronous operation of said machine and power directional means controlled by said asynchronous responsive means, said power directional means including a differential relay having two elements respectively energized in accordance with the sum and difference of the armature current and voltage of said machine.

11. In combination, an energized alternating current circuit, a synchronous dynamoelectric machine connected thereto, a prime mover driving said machine and means for regulating the speed of said prime mover under asynchronous operation of said machine so as to restore synchronous operation thereof, and means responsive to the current induced in the field circuit of said machine during asynchronous operation thereof for reducing the load on said prime mover when the speed of said machine decreases below a predetermined value.

12. In combination, an energized alternating current circuit, a synchronous dynamoelectric machine connected thereto, a prime mover driving said machine and means for regulating the speed of said prime mover under asynchronous operation of said machine so as to restore synchronous operation thereof, and means responsive to an induced field current of a predetermined frequency during asynchronous operation of said machine for reducing the load on said prime mover.

13. In combination, an energized alternating current circuit, a synchronous dynamoelectric machine connected thereto, a prime mover driving said machine and means for regulating the speed of said prime mover under asynchronous operation of said machine so as to restore synchronous operation thereof, and means responsive to an induced field current of a predetermined frequency during asynchronous operation of said machine for decreasing the direct current excitation of the field winding of said machine.

ERNST F. W. ALEXANDERSON.